Nov. 8, 1949     W. E. GANTER, JR     2,487,327
LINOLEUM CUTTING MACHINE

Filed Aug. 9, 1947     2 Sheets—Sheet 1

Inventor
William E. Ganter Jr
By Scott L. Norvill
Attorney

Nov. 8, 1949     W. E. GANTER, JR     2,487,327
LINOLEUM CUTTING MACHINE
Filed Aug. 9, 1947     2 Sheets-Sheet 2
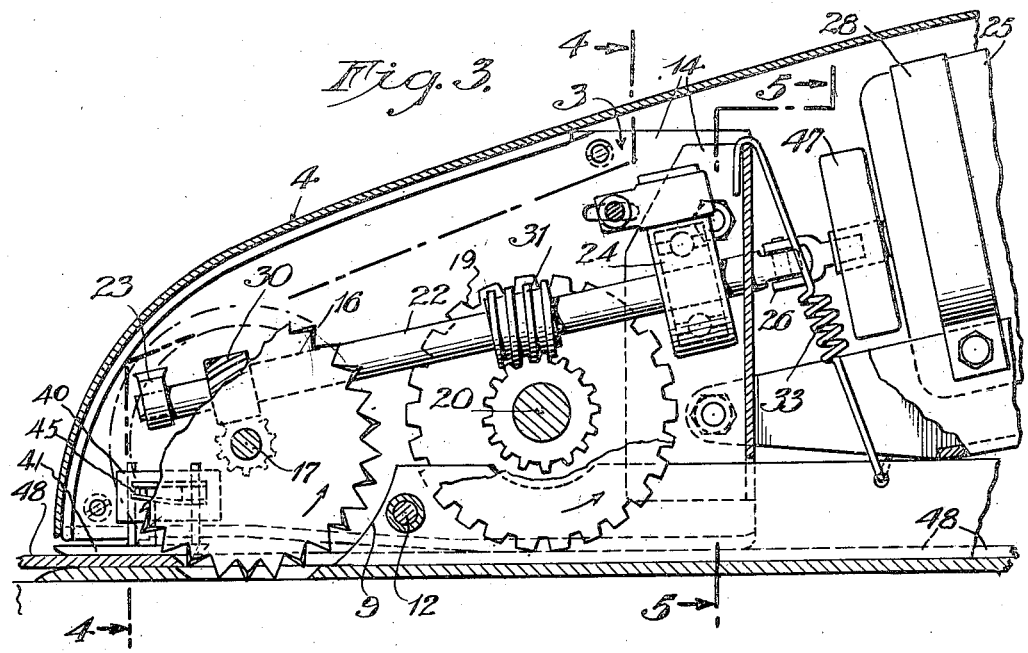
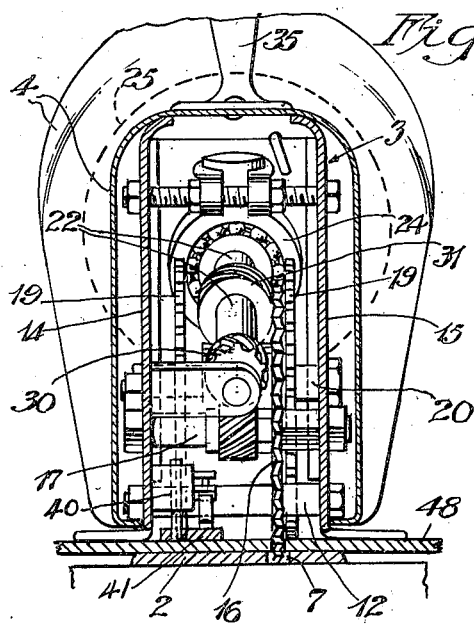 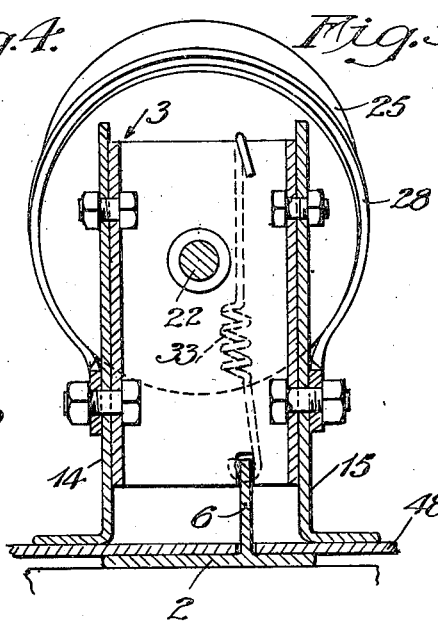
Inventor
William E. Ganter, Jr.
By Scott L. Norviel
Attorney Patented Nov. 8, 1949

2,487,327

UNITED STATES PATENT OFFICE 2,487,327

LINOLEUM CUTTING MACHINE

William E. Ganter, Jr., Phoenix, Ariz.

Application August 9, 1947, Serial No. 767,827

3 Claims. (Cl. 30—167)

This invention pertains to linoleum cutting machines.

Heretofore, various machines have been proposed to save the labor required in cutting measured lengths of linoleum from large rolls. Usually, the measuring and cutting is done on a floor with a hand knife. This requires a great deal of bending-over and kneeling on the part of the person measuring and cutting the linoleum; also, due to the nature of linoleum, hand knives suitable for cutting are dangerous and slips and accidents are frequent.

This machine is intended to be used wherever measured lengths of linoleum are cut from factory rolls in filling retail sales orders or in preparing mail order shipments.

One of the objects of the invention is to provide a power driven machine which after being set will automatically cut across a strip of linoleum in a straight line.

Another object is to provide such a machine with mechanism whereby it may be set at the edge of a linoleum strip and the mechanism started whereupon the machine will propel itself across the strip, cutting the material in a straight line in the direction in which it was originally set.

Another object is to provide a cutter of the type described with an under shoe having a vertical dividing guide blade which follows a rotary saw cut made in the material whereby the machine is steered and held to a predetermined cutting line.

Still another object is to provide a motor driven linoleum cutting saw which will cut across sheets of linoleum, propelling itself throughout the cut, and will automatically terminate operation when the cut is finished.

Still further objects will appear hereinafter and include the construction of the machine from a small number of parts which can be easily and cheaply manufactured and assembled.

Figure 1:
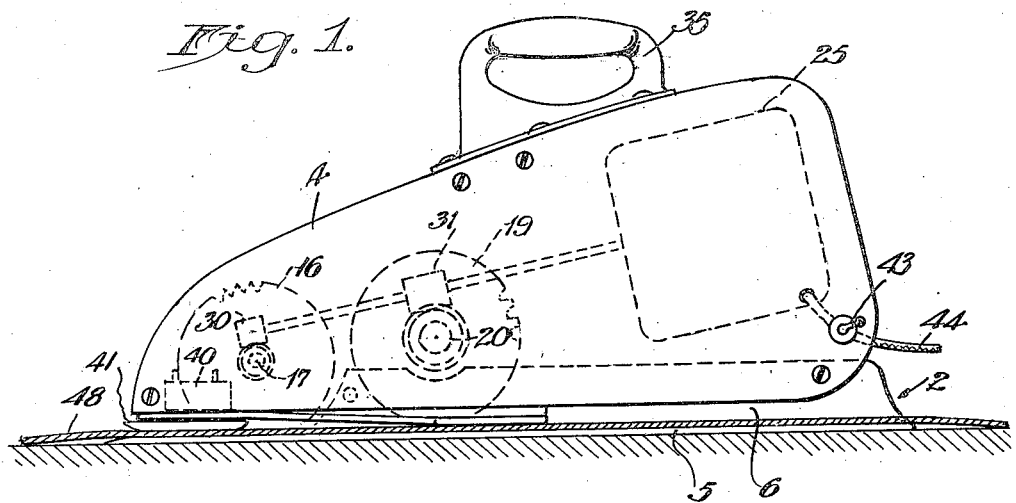
Figure 2:
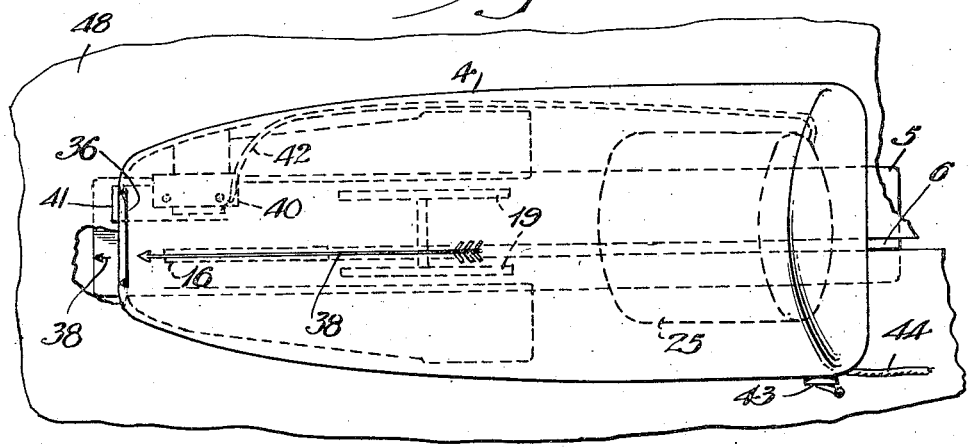
Figure 6:
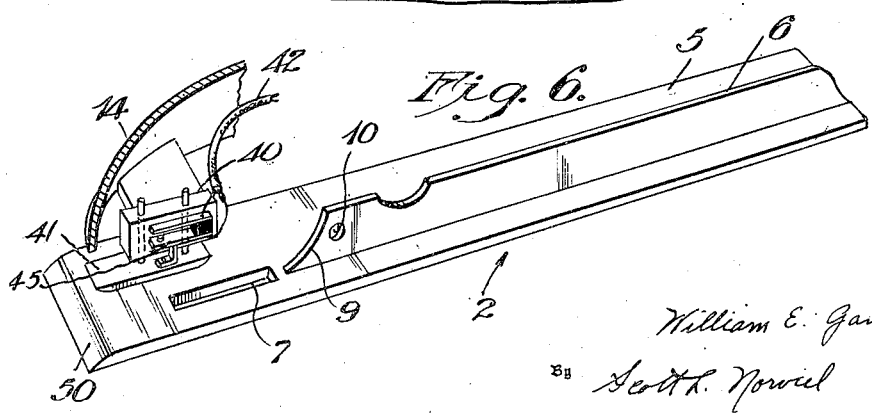

I attain the foregoing objects by means of the device and its several operative parts shown in the accompanying drawings, in which, Figure 1 is a side elevation of the entire machine;

Figure 2, a plan view thereof;

Figure 3, a vertical section of the front portion of the device;

Figure 4, a cross section thereof, taken on line 4—4, Figure 3;

Figure 5, a cross section taken on line 5—5, Figure 3; and,

Figure 6, a perspective view of the shoe and disconnecting switch.

Similar numerals refer to similar parts in the several views.

In general, the machine consists of a shoe 2 adapted to run under the linoleum during a cutting operation; a frame 3, supporting the cutting and driving mechanism; and an outer case 4.

The shoe 2 has a flat base plate 5 to which a vertical guide plate 6 is appended. Near the forward end of the guide plate is cut off arcuately at 9 to provide operating room for the linoleum saw. A slot 7 is cut in the base plate just ahead of this cut, to accommodate a segmental portion of this saw. A hole 10 is drilled thru the guide plate a short distance behind the arcuate cut 9 to receive the body attachment bearing bolt 12.

The frame 3 includes right and left side plates 14 and 15, respectively, between and on which the several working parts of the device are supported. At the front of the frame a linoleum cutting saw 16 is supported on transverse shaft 17. To the rear of this saw there is a pair of toothed traction wheels 19, supported on a transverse shaft 20. Both the saw and the traction wheels are operated by a centrally positioned longitudinally extending drive shaft 22, supported on bearings 23 and 24 which is, in turn, driven by electric motor 25 thru universal joint 26. Motor 25 is supported in the frame in any advantageous manner, for example by a strap 28.

Low ratio worm gearing 30 drives the saw at a comparatively rapid speed, approximating the speed of shaft 22; while high ratio worm and sector gearing 31 drives the shaft carrying the traction wheels 19, at a comparatively slow speed.

The frame 3 is pivotally connected to the shoe by the transverse bearing bolt 12 which is positioned below the axes of both the saw and traction wheels and approximately midway between them. This gives the frame a hinge like up and down motion, relative to the shoe. The rear portion of the frame is urged downward toward the rear portion of the shoe by spring 33. This causes the traction wheels to bear resiliently towards the shoe flanges on each side of the guide plate 6. These wheels will, therefore, engage linoleum passing over the shoe while being cut.

The case 4 fits over and is attached to the frame. It is provided with a carrying handle 35 at the top and with a marking guide 36 at the front which indicates a line along the front edge of the case at right angles to the cutting direction of the saw and guide plate. An indicating arrow tipped line 38 on the front of the top face of the shoe and continuing along the top of the front portion of the case indicates the cutting line of the saw.

An electrical box switch 40 is mounted on the right hand frame number 14 (Fig. 6). A spring depressed riding plate 41 is positioned to be raised by the entering edge of the linoleum 48 to be cut, and this closes electrical contacts 45 within the box. These are held closed until the sheet of linoleum has moved beyond the rear edge of the riding plate 41, whereupon the contacts open. A cord 42 from this switch is connected in series with motor 25 a manual switch 43, and an extension cord 44.

After a cut, the inertia of the moving parts, enhanced by fly wheel 47 is sufficient to carry the device thru to finish the cut and to move clear of the edge of the sheet after the current has been disconnected.

In use, the device is positioned, using handle 35, adjacent to a sheet of linoleum 48 to be cut so that the horn 50 of the shoe passes beneath the sheet and the guide lines 36 and 38, indicate the desired direction for the cut. Cord 44 is connected to an electrical outlet, switch 43 closed, and the machine pushed onto the sheet until switch 40 closes and the saw cuts far enough for traction wheels 19 to engage the linoleum. The machine then moves forward across the sheet until it reaches the far end whereupon switch 40 opens, shuts off motor 25, and the inertia of the moving parts carries the machine off the sheet. The guide plate 6 rides in the cut as it is made and guides and directs the course of the saw. Since these linoleum sheets are usually quite wide, it is obvious that a considerable amount of work on the part of the operator is avoided. No guiding is necessary because the machine is maintained in a straight course by the contact of the linoleum material on each side of the cut with the guide plate. The mechanism of the machine, therefore, both propels and guides it until it has finished the cut.

It is intended that the following claims be broadly construed, and that the specific elements defined include all mechanical equivalents and substitutions.

I claim:

1. A linoleum cutting machine comprising a shoe having a vertical guide plate, a frame hinged thereto at the front and resiliently held thereon at the rear, a power driven linoleum saw in the forward part of said frame alined with said guide plate and toothed traction wheels operative and positioned on each side of said guide plate to the rear of said saw; power means for driving said saw and wheels, and a case covering said frame having indicia thereon indicating the cutting line of said saw.

2. A linoleum cutting machine comprising a shoe having a horizontal base plate, and a vertical guide plate, extending above the upper face thereof; a frame hinged in its forward portion to said shoe by a transverse bearing bolt extending thru said frame and said vertical guide plate, a spring urging the rear portion of said frame toward said shoe; a rotary cutting saw operative in the forward portion of saw frame; a pair of toothed traction wheels journalled in the rear portion thereof and adapted to bear toward said shoe base plate on each side of said guide plate; motor mechanism for driving said saw and said traction wheels simultaneously, said rotary saw being driven at cutting speed and said traction wheels at a slower propulsive speed; and a case covering said frame having a lifting handle, and markings indicating the cutting line of said saw.

3. A self-propelled linoleum cutting machine having a shoe with a horizontal plate adapted to move under a sheet of linoleum as it is cut, and a vertical guide plate thereon adapted to move thru a cut made in a sheet of linoleum as it is cut, a frame hinged at its forward end to the forward end of said shoe; a linoleum saw transversely journalled in said frame, operatively alined with said vertical guide plate and positioned at the forward end thereof, said horizontal shoe plate being slotted to accommodate a lower segmental portion of said saw; toothed traction wheels transversely journalled in said frame to the rear of said saw and positioned to bear on linoleum being cut as the cut portions pass on each side of said shoe guide plate; a spring attached between the rear portion of said frame and said shoe adapted to urge the rear portions of said parts together so as to urge said traction wheels toward said horizontal shoe plate; driving mechanism including an electrical motor geared to said saw to turn it at proper cutting speed and to said traction wheels to drive them at proper propulsive speed; a switch in the forward portion of said frame having an operative plate adapted to bear on linoleum passing over said horizontal shoe plate and to place the motor in operative condition as long as it bears on said linoleum; means for continuing the action of said driving mechanism, after said switch is opened, including a fly wheel on said motor shaft; and a case covering said frame having markings thereon indicating the cutting line of said saw.

WILLIAM E. GANTER, Jr.

REFERENCES CITED

The following references are of record in the file of this patent:

UNITED STATES PATENTS

| Number | Name | Date |
| --- | --- | --- |
| 915,752 | Edlund | Mar. 23, 1909 |
| 1,102,018 | Dodds | June 30, 1914 |
| 2,217,923 | Silverman | Oct. 15, 1940 |

FOREIGN PATENTS

| Number | Country | Date |
| --- | --- | --- |
| 73,724 | Sweden | Mar. 1, 1932 |
| 430,684 | France | Aug. 19, 1911 |
| 557,384 | Germany | Aug. 22, 1932 |